(12) United States Patent
Ichikawa et al.

(10) Patent No.: US 8,451,810 B2
(45) Date of Patent: May 28, 2013

(54) WIRELESS LAN SYSTEM, A TERMINAL AND A RECORDING MEDIUM READABLE BY A COMPUTER

(75) Inventors: Goki Ichikawa, Aichi (JP); Hideki Ishii, Aichi (JP)

(73) Assignee: Buffalo Inc., Nagoya-shi, Aichi-ken (JP)

( * ) Notice: Subject to any disclaimer, the term of this patent is extended or adjusted under 35 U.S.C. 154(b) by 412 days.

(21) Appl. No.: 12/509,475

(22) Filed: Jul. 26, 2009

(65) Prior Publication Data

US 2009/0279526 A1    Nov. 12, 2009

Related U.S. Application Data (63) Continuation of application No. PCT/JP2008/052350, filed on Feb. 13, 2008.

(30) Foreign Application Priority Data

Feb. 16, 2007    (JP) ................. 2007-036265

(51) Int. Cl.
  *H04W 4/00*  (2009.01)
  *H04K 1/00*  (2006.01)
  *G06F 15/16*  (2006.01)
  *G06F 7/04*  (2006.01)
  *H04W 84/12*  (2009.01)
  *H04W 12/00*  (2009.01)
  *H04L 29/06*  (2006.01)

(52) U.S. Cl.
  CPC ............. *H04W 84/12* (2013.01); *H04W 12/00* (2013.01); *H04L 29/06* (2013.01); *H04L 63/08* (2013.01)
  USPC ............... 370/338; 380/270; 709/228; 726/2

(58) Field of Classification Search
  USPC ............ 370/328, 331, 338, 463; 709/228, 709/250; 726/2; 380/270
  See application file for complete search history.

(56) References Cited

U.S. PATENT DOCUMENTS 7,359,363 B2 *  4/2008  Sakai ............................ 370/338
7,430,181 B1 *  9/2008  Hong ............................ 370/254

(Continued)

FOREIGN PATENT DOCUMENTS

| JP | 2005-175524 A | 6/2005 |
| JP | 2006-020088 A | 1/2006 |
| JP | 2006-173946 A | 6/2006 |

OTHER PUBLICATIONS

Machine Translation of JP 2006-020088 A.*

(Continued)

*Primary Examiner* — Paul H Masur
(74) *Attorney, Agent, or Firm* — Yokoi & Co., U.S.A., Inc.; Toshiyuki Yokoi (57) ABSTRACT

In a wireless LAN system, a terminal that includes a device for wireless LAN connection is capable of simple connection setting for wireless LAN. In said terminal, a simple connection setting recorder records each methods of simple connection setting that easily sets the simple connection setting for the wireless LAN, and an access point identifier identifies connected access point by detecting an information that is output by the access point. And a connection setting selector selects a simple connection setting corresponding to the access point, which the access point identifier identified from the simple connection settings recorded in the simple connection setting recorder. Finally, a connection setting processor processes connection setting, which corresponds to each method of the simple connection settings that the connection setting selector selected.

5 Claims, 9 Drawing Sheets

U.S. PATENT DOCUMENTS

| | | | | |
|---|---|---|---|---|
| 2002/0007407 | A1* | 1/2002 | Klein | 709/225 |
| 2004/0253943 | A1* | 12/2004 | Suzuki et al. | 455/411 |
| 2005/0132193 | A1* | 6/2005 | Ishidoshiro et al. | 713/171 |
| 2006/0039339 | A1* | 2/2006 | Cohen | 370/338 |
| 2008/0037444 | A1* | 2/2008 | Chhabra | 370/254 |
| 2008/0137553 | A1* | 6/2008 | Hsu et al. | 370/254 |
| 2008/0160914 | A1* | 7/2008 | McRae et al. | 455/41.2 |
| 2008/0175187 | A1* | 7/2008 | Lowry et al. | 370/328 |
| 2009/0225682 | A1* | 9/2009 | Grote-Lopez et al. | 370/255 |

OTHER PUBLICATIONS

International Search Report for PCT/JP2008/052350 dated Mar. 11, 2008.

PCT Written Opinion of the International Searching Authority for PCT/JP2008/052350 dated Mar. 11, 2008.

Kenji Muramatsu, "Scei no Game-ki 'PCP' ni 'AOSS' to 'Rakuraku Musen Start' ga Tosai", Broadband Watch, Kabusiki Kaisha Impress Watch, Feb. 28, 2008.

"Nintendo DS ni Tsuzuki Wii nimo 'Rakuraku Musen Start' 'AOSS' ga Tosai", Maikomi Jurnal, Mainichi Communications Inc., Dec. 4, 2006.

Japanese Notice of the reason for refusal dated Jun. 8, 2010.

Chinese Office Action dated Jun. 15, 2011.

Japanese Notice of the reason for refusal dated Mar. 16, 2010.

* cited by examiner

| information | contents |
|---|---|
| Timestamp | numeric value of timer |
| Beacon Interval | interval of beacons |
| Capability Information | variety of information concerning PCF, encrypting or not |
| Service Set ID | identifier of ESS or IBSS |
| Supported Rates | a list of supported wireless transfer rate |
| FH Paramaeter Set | an information for hop pattern |
| DS Parameter Set | channel number wireless communication |
| CF Parameter Set | parameter for PCF |
| IBSS Parameter Set | variety of information used for ad-hoc mode |
| TIM | variety of information concerning power management |
| special ID | an identifier to distinguish an original simple connection setting |

RELATED ART

FIG. 9

RELATED ART

WIRELESS LAN SYSTEM, A TERMINAL AND A RECORDING MEDIUM READABLE BY A COMPUTER

CROSS-REFERENCES TO RELATED APPLICATIONS

This Application is a CONTINUATION application claiming the benefit of priority of the co-pending International Patent Application No. PCT/JP2008/052350 with an international filing date of 13 Feb. 2008 that designated the United States, which claims the benefit of priority of Japanese Patent Application No. 2007-036265, filed 16 Feb. 2007, the entire disclosures of all Applications are expressly incorporated by reference in their entirety herein.

BACKGROUND OF THE INVENTION (1) Field of the Invention

This invention relates to a wireless LAN system which provides simple connection setting for a wireless LAN.

(2) Description of the Related Art

Figure 8:
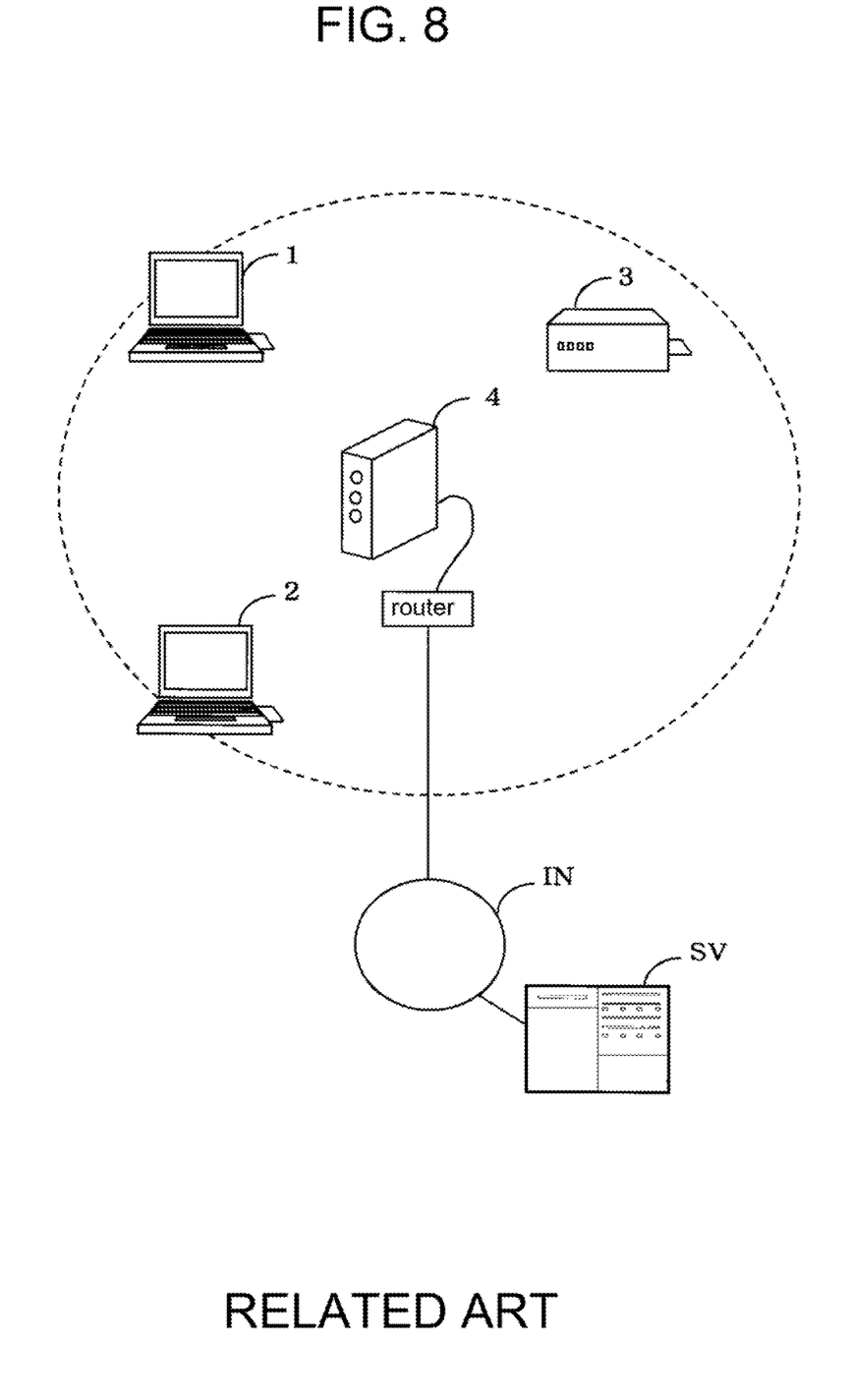
FIG. 8 is a figure showing hardwares constituting conventional wireless LAN.

An access point which is a relay for a wireless LAN is used as a device which connects plural terminals in remote area to Internet. In addition, in late years the access point begins to be used by not only the personal computer but also a family video games or household electrical appliance. FIG. 8 shows personal computers 1,2 and a family game console 3 as terminals. When users use wireless LAN, users need to set connection setting of the wireless LAN for a access point 4 and each terminals 1, 2, 3. For example, the connection setting of the wireless LAN includes security level between the access point 4 and terminals 1, 2, 3 or settings such as ESS-ID beforehand. Therefore some knowledge of the wireless LAN is required in order to set the security level and setting of ESS-ID.

Therefore, following method is disclosed as a method to simplify connection setting of a wireless LAN. Namely, patent document 1 discloses a method to automatically set connection setting of the wireless LAN by easy operation of a button on the access point and the terminals, or an icon.

Figure 9:
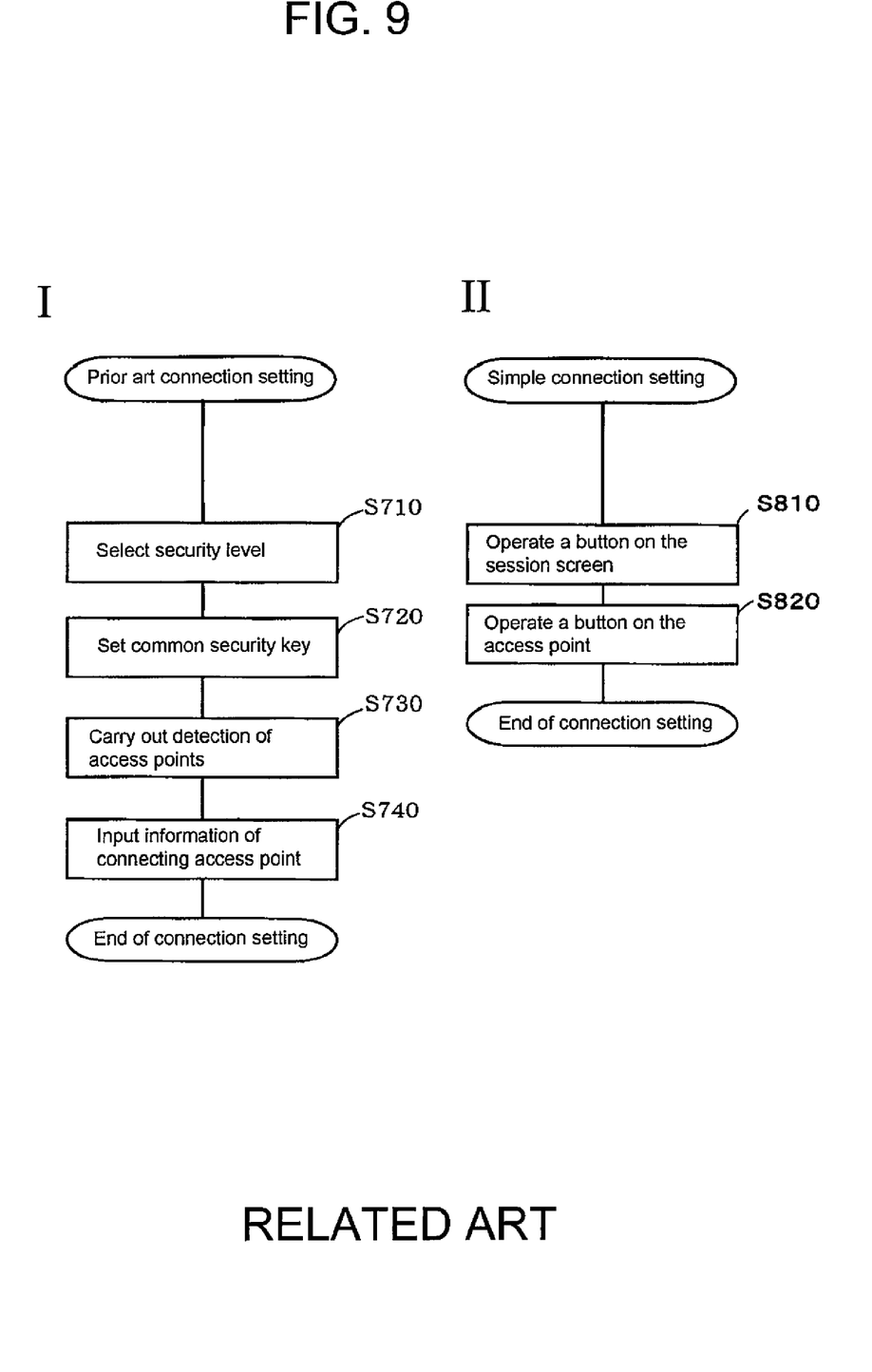
FIG. 9 is a flow chart showing an example of user's operation for the simple connection setting and normal connection setting.

FIG. 9 shows user side procedures to set regular connection setting (I). As shown in the figure, user completes setting of security level (step S710), setting of common security level between terminals to be connected with each other (step S720), detection of access points (step S730), and inputting information elements output by the access points when it is detected (step S740). In contrast, according to simple connection setting (II), as an example, the connection setting of the wireless LAN will be performed just by a button operation (step S810) at the terminal side and also a button operation (step S820) at the access point as the example.

[patent document 1] Japanese Patent Laid-Open No. 2005-175,524

BRIEF SUMMARY OF THE INVENTION

The simple connection setting mentioned above is used when the access point and each terminals are connected individually. And it is necessary that the access point and each terminals must be capable of the same simple connection setting. For example, an example in FIG. 8 is assumed that the simple connection setting that the access point 4 supports is A method, and the simple setting that terminals 1,2 support is also the A method, and the simple connection setting that terminal 3 support is B method. In this case, only the terminals 1,2 can be set by the simple connection setting with the access point 4. And in order to set for the terminal 3, it is necessary for the user to carry out the normal wireless LAN connection setting shown in FIG. 9 (I). Therefore, although the terminals themselves support simple connection setting, there were cases that simple connection to the access point can not be carried out. In addition, it is necessary for the user to recognize beforehand which simple connection settings are supported by the access point if the user need to cope with the access point which supports each methods of the simple connection. Therefore the users are required with some knowledge of the wireless LAN as well as ordinal connection setting. And an advantage of the simple connection setting which makes construction of wireless LAN to be easy for the users without knowledge of the wireless LAN could not be pursued.

This invention relates to a wireless LAN which is capable of connection setting by simple operation for any access points and terminals corresponding to what kind of simple connection setting.

One aspect of the present invention provides a wireless LAN system, comprising:

an access point and a terminal that includes a device for wireless LAN connection is capable of simple connection setting for wireless LAN; said terminal comprises a simple connection setting recorder to record each methods of simple connection setting that easily sets the simple connection setting for the wireless LAN, an access point identifier to identify connected access point by detecting an information that is output by the access point, a connection setting selector to select a simple connection setting corresponding to the access point, which the access point identifier identified from the simple connection settings recorded in the simple connection setting recorder, and a connection setting processor to process connection setting, which corresponds to each method of the simple connection settings that the connection setting selector selected.

Namely, when a simple connection setting of wireless LAN system of this invention is processed, an access point identifier identifies a connected access point by detecting an information which is output by the access point. Then, a connection setting selector selects a simple connection setting corresponding to the access point which the access point identifier identified from the simple connection settings recorded in the simple connection setting recorder.

Therefore, since connection setting of wireless LAN can be processed automatically against any access point which adapts any kind of simple connection setting, users can accomplish connection setting easily.

According to another aspect of the invention, said terminal comprises said access point identifier that detects the information to identify the access point to be connected with as the first detecting operation and said connection setting processor that detects the information to process the connection setting to connect with the identified access point for connection as the second detecting operation, said connection setting processor uses the information that said access point identifier detects by the first detecting operation, omitting second detecting operation.

Namely, in order to process connection setting, the wireless LAN system of this aspect detects an access point by the first detecting operation, and determines each setting value for the selected simple connection setting using the information detected by the first detecting operation.

Therefore, using the information detected by the first detecting operation for the information to be detected by the second detecting operation, the second detecting operation can be omitted. Since the first and second detection operations are carried out by using a device, they take some time. Therefore omitting the second detecting operation, processing time of the simple connection setting can be shortened.

According to another aspect of the invention, said terminal detects one of beacon and probe response output by the access point, and detects the information stored in one of the beacon and probe response. Namely, in order to detect the information, one of a beacon and a probe response output by the access point is received, and the information stored in one of the beacon and the probe response is detected. A beacon is a signal to be broadcasted at a fixed interval in order to inform the existence of the access point, and a plurality of information are stored in the beacon. In addition, a probe response is a response which the access point replies to a probe request from the terminal. Therefore using the beacon or probe response for detecting the information, it is not necessary to equip a new signal generator for the access point.

Furthermore, this invention is effective for the constitution consisting of the terminal only. In addition, this invention is also effective where a program which makes the terminal operate as explained above is stored in a recording medium.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

Figure 1:
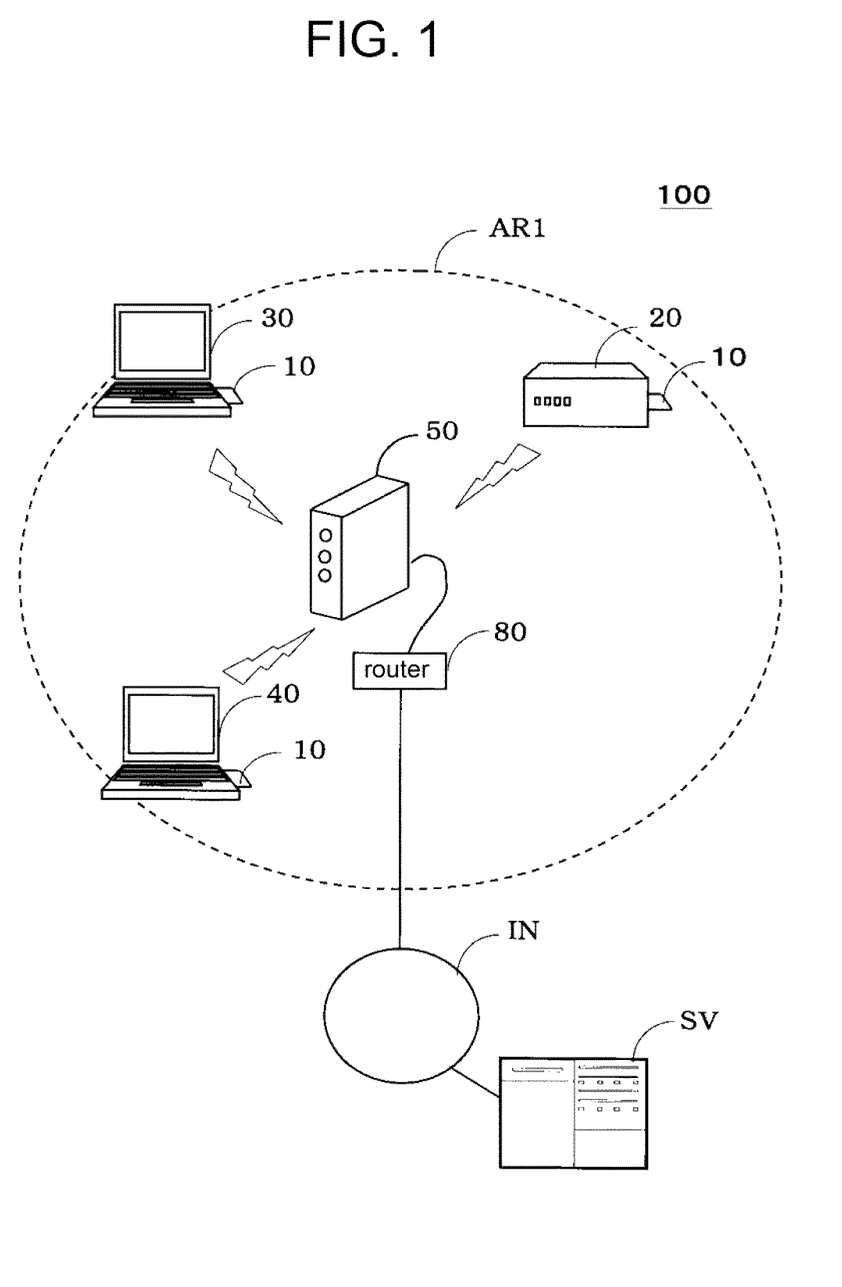
FIG. 1 is a figure expressing constitution of hardware for the wireless LAN system of this invention.

In accordance with the following order, an embodiment of the present invention will be described.
(1) The first embodiment
(1-1) Abstract of this invention
(1-2) The constitution of the wireless LAN system
(1-3) Simple connection setting
(2) The second embodiment
(3) Summary (1) THE FIRST EMBODIMENT (1-1) Abstract of this Invention
FIG. 1 is a figure showing constitution of hardware for the wireless LAN system 100 of this invention. As shown in FIG. 1, the wireless LAN system 100 constitutes wireless LAN between terminals 20, 30, 40 and the access point 50 in wireless communication area AR1. In addition, connection setting of the wireless LAN between the terminals 20, 30, 40 and the access point 50 can be set by a registration button 71 (explained later in detail) of the access point 50 or by operating the terminals 20, 30, 40 (a simple connection setting as follows).

According to the wireless LAN system 100 of this invention, users can set simple connection by easy operation between the access point 50 with any kind of simple connection setting and the terminals 20, 30, 40. For example, where the access point 50 supports either A method of the simple connection setting or B method of the simple connection setting, the terminals 20, 30, 40 of this invention can automatically set simple connection setting with the access point 50 and carry out the connection of the wireless LAN by an easy operation of the button.

(1-2) The Constitution of the Wireless LAN System
As shown in FIG. 1, the wireless LAN system 100 comprises terminals 20, 30, 40, a wireless LAN adapter 10 as a device for connecting to the terminals 20, 30, 40, and an access point 50. Hereby data which acquired in Internet IN through a router 80 can be output to the terminal 20 through the wireless LAN adapter 10 from the access point 50. In addition, the connection setting of the wireless LAN between the terminal 20, 30, 40 and the access point 50 are set wirelessly.

Figure 2:
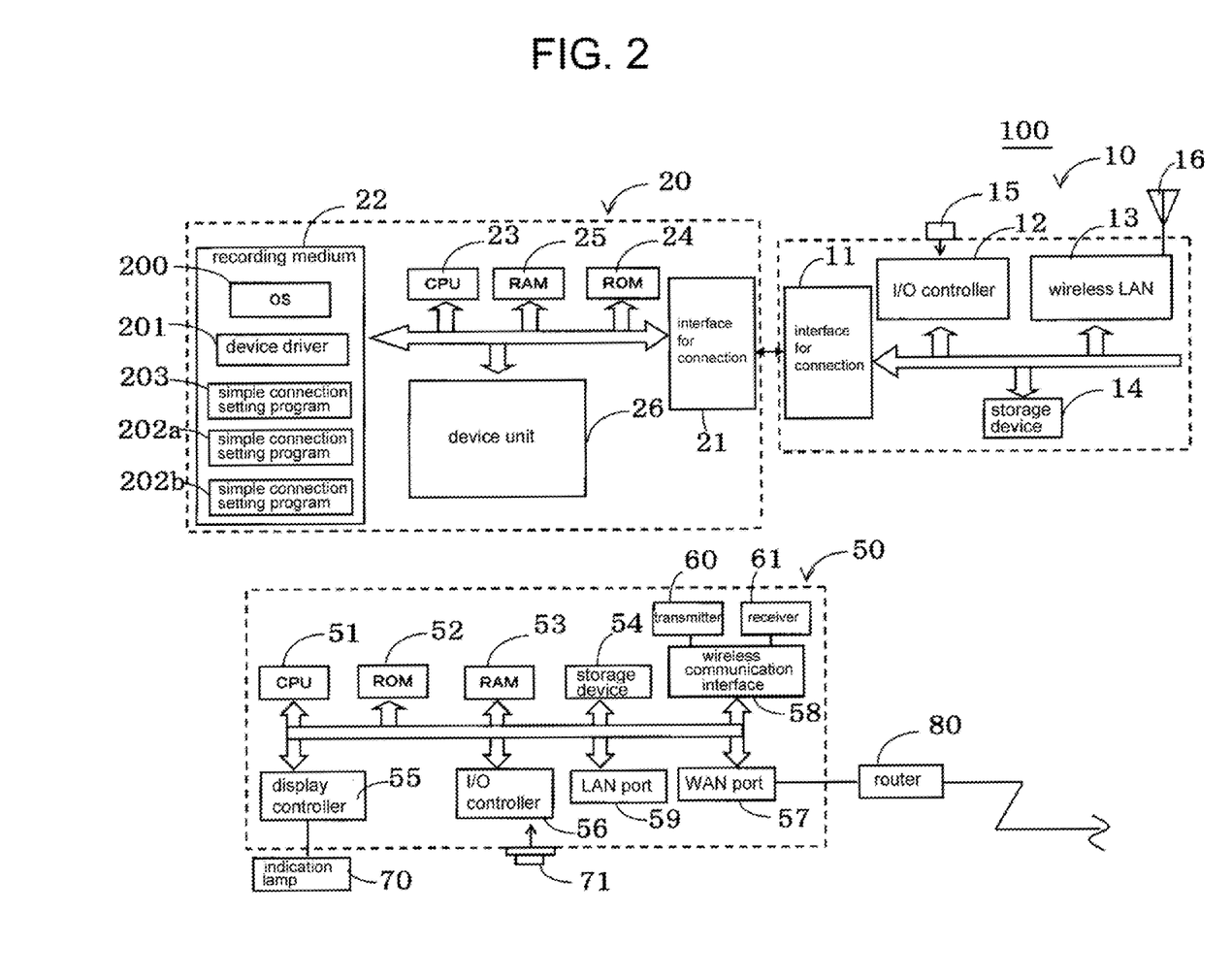
FIG. 2 is a block diagram showing constitution of each hardware of the wireless LAN system.

The access point 50 outputs information to each terminal 20, 30, 40 by radio from server SV through Internet IN. The access point 50 possesses, as shown in FIG. 2, CPU51, ROM52 which is mutually connected to the CPU51 via a bus, RAM53, storage device 54 of non-volatilization such as a hard disk, WAN port 57 as a network interface, LAN port 59 for the connection with a wired LAN, wireless communication interface 58, display controller 55, and I/O controller 56.

Various programs for communication with the terminal 20, 30, 40 in wireless communication area AR1 and the data which are necessary for the connection to Internet IN are stored in ROM52. A push-type registration button 71 is connected to the I/O controller 56, and allocated in the state such as its pressing part is exposed from housing surface of the access point 50. Various indication lamps 70 that displays a connection state and a communication state of wireless LAN by flashing on and off are connected to the display controller 55.

A transmitter 60 transmitting an electric wave and a receiver 61 receiving an electric wave are connected to the wireless communication interface 58. The transmitter 60 and the receiver 61 are built-in in the access point 50 in the state such as capable of transmission of radio to out side and receiving of radio from outside respectively. In addition, the transmitter 60 broadcasts a beacon or a probe response at a scheduled interval. A beacon is a signal which the access point 50 outputs as an identity information for the terminal located around. Therefore, the beacon is used to inform being accessible by the access point 50 to the wireless LAN adapter 10 at the time of connection setting between the access point 50 and the terminal 20, 30, 40. In addition, the beacon stores information such as ESS-ID in its frame and the terminal which received the beacon can acquire the ESS-ID of the access point and other information. Further, against a probe demand from the terminal, the access point 50 outputs the information in a probe response.

Figure 3:
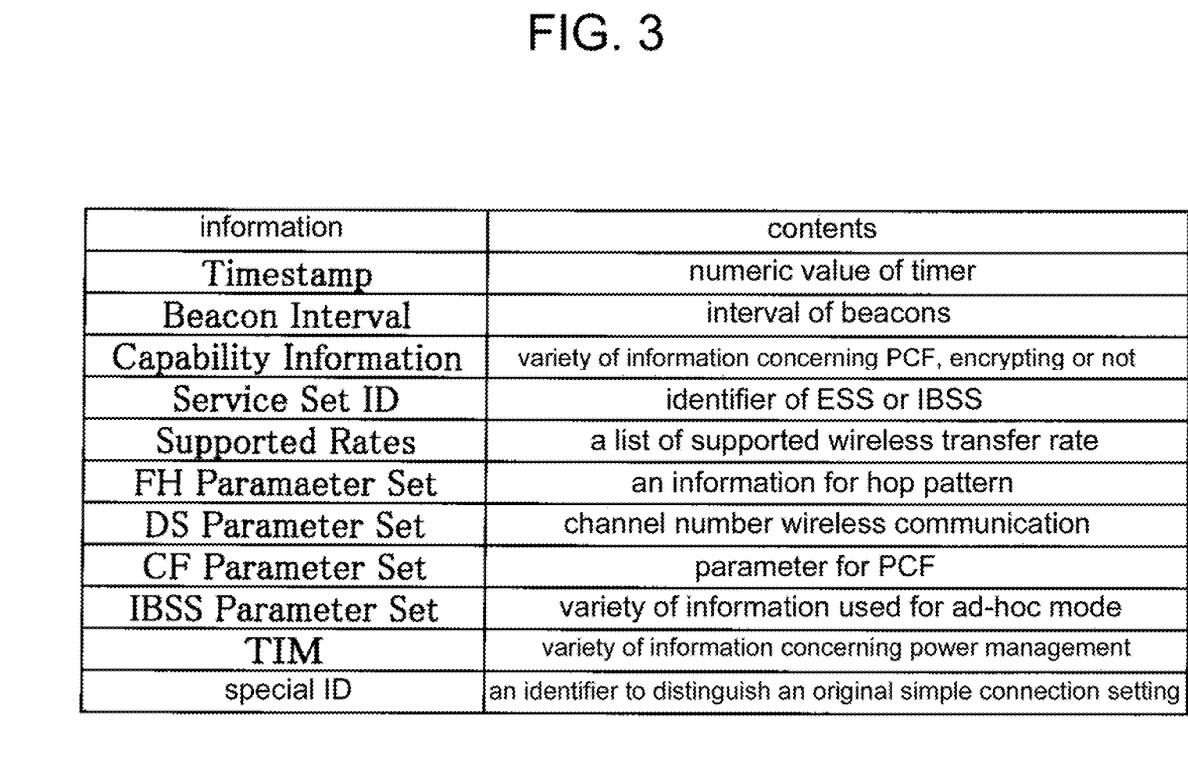
FIG. 3 is a figure showing an information stored in a beacon or a probe response.

FIG. 3 is a figure showing, as an example, an information stored in a beacon or a probe response. As shown in the figure, the information stored in the frame of the beacon or the probe response is used to inform the terminals the various information that are necessary for communication. When the terminals 20, 30, 40 receive each information shown in the figure, the terminal 20, 30, 40 carry out identification of the access point 50 as a connecting point and various setting of wireless LAN connection.

The wireless LAN adapter 10 receives data and a signal transmitted from the access point 50. And the wireless LAN adapter 10 outputs data and a signal from terminals 20, 30, 40 to the access point 50. The wireless LAN adapter 10 is constituted so that the wireless communication interface 11, the wireless LAN13 and the record device 14 as a nonvolatile memory can communicate with each other through the I/O controller 12 and the bus. The record device 14 records programs to control the wireless LAN adapter 10. In addition, an antenna 16 is connected to the wireless LAN13 in order to receive wireless communication that is output by the access point 50 and the beacon or the probe response explained above. Under the control of the programs recorded in the record device 14, the data, the beacon and the probe response received by the antenna 16 is output to the wireless communication interface 11 through the bus. Further, a simple connection setting button 15 to connect to the access point 50 through wireless LAN by using the simple connection setting is connected to the I/O controller 12. And the simple connection setting button 15 is located on outside of a housing of the wireless LAN adapter 10.

When the terminals 20, 30, 40 are connected with the wireless LAN adapter 10, they receive data which are output from the access point 50. In addition, the terminals 30, 40 are well-known personal computers and the terminal 20 is a family game console. In the terminals 20, 30, 40, an connection interface 21 to transfer data with the wireless LAN adapter 10, ROM24 that stores various programs for CPU23 to operate processing, RAM25 for CPU23 to develop the programs, a hard disk and a CD-ROM drive as nonvolatile recording medium 22 (simple connection setting recording means) that stores a program for connection setting for wireless LAN, and a device unit 26 that carries out predetermined functions are connected to the CPU23 through a bus so that they can mutually communicate with the CPU23. Of course each terminals can be not only a family game console but also the other terminals such as a household electrical appliance and a PDA (Personal Digital Assistant).

Programs to control wireless LAN system 100 is recorded in a recording mediums 22 of the terminals 20, 30, 40. More concretely, such programs include OS200 that manages the whole the terminals 20, 30, 40 and offers basic functions which are commonly used by application softwares stored in the recording medium 22, a device driver 201 to control the access point 50 and the wireless LAN adapter 10, a plurality of simple connection setting programs 202 for simple connection setting, and a connection setting control program 203 that chooses and have run simple connection setting program 202. In addition, a connection function to carry out the connection of the wireless LAN between the terminals 20, 30, 40 and the access point 50 is incorporated in the OS200.

The OS200 connects the access point 50 and the terminals 20, 30, 40 by wireless LAN after having set security level and ESS-ID between the access point 50 and each terminals 20, 30, 40 in accordance with simple connection setting program 202. In addition, the device driver 201 controls each device constituting wireless LAN adapter 10 according to an operation at terminal side. When the device driver 201 is incorporated in the terminals 20, 30, 40, the terminals 20, 30, 40 recognize the attached wireless LAN adapter 10, and become available to control the wireless LAN adapter 10.

The simple connection setting program 202 is a program to set security level and ESS-ID for wireless LAN connection. More concretely, in order to set connection setting for wireless LAN connection, the simple connection setting program 202 automatically acquires from the access point 50 various information that the OS200 needs in order to set connection setting of wireless LAN, and outputs them to the OS200. In addition, the recording mediums 22 of the terminals 20, 30, 40 of this invention store simple connection setting programs 202 corresponding to each method of the simple connection settings beforehand. And the terminals 20, 30, 40 cope with each method of the simple connection setting with them.

The connection setting control program carries out simple connection setting when the terminals 20, 30, 40 or a registration button 71 of access point 50 are operated by the user. In addition, according to an information output by the access point 50, the connection setting control program 203 chooses simple connection setting program 202 that the access point 50 corresponds from ones in the recording medium 22. More concretely, when a type of the simple connection setting of the connecting access point 50 is detected by a beacon or a probe response, a simple connection setting program 202 corresponding to the type of the detected simple connection setting is read out, and carries out simple connection setting between the terminal and the access point 50.

(1-3) Simple Connection Setting

Figure 4:
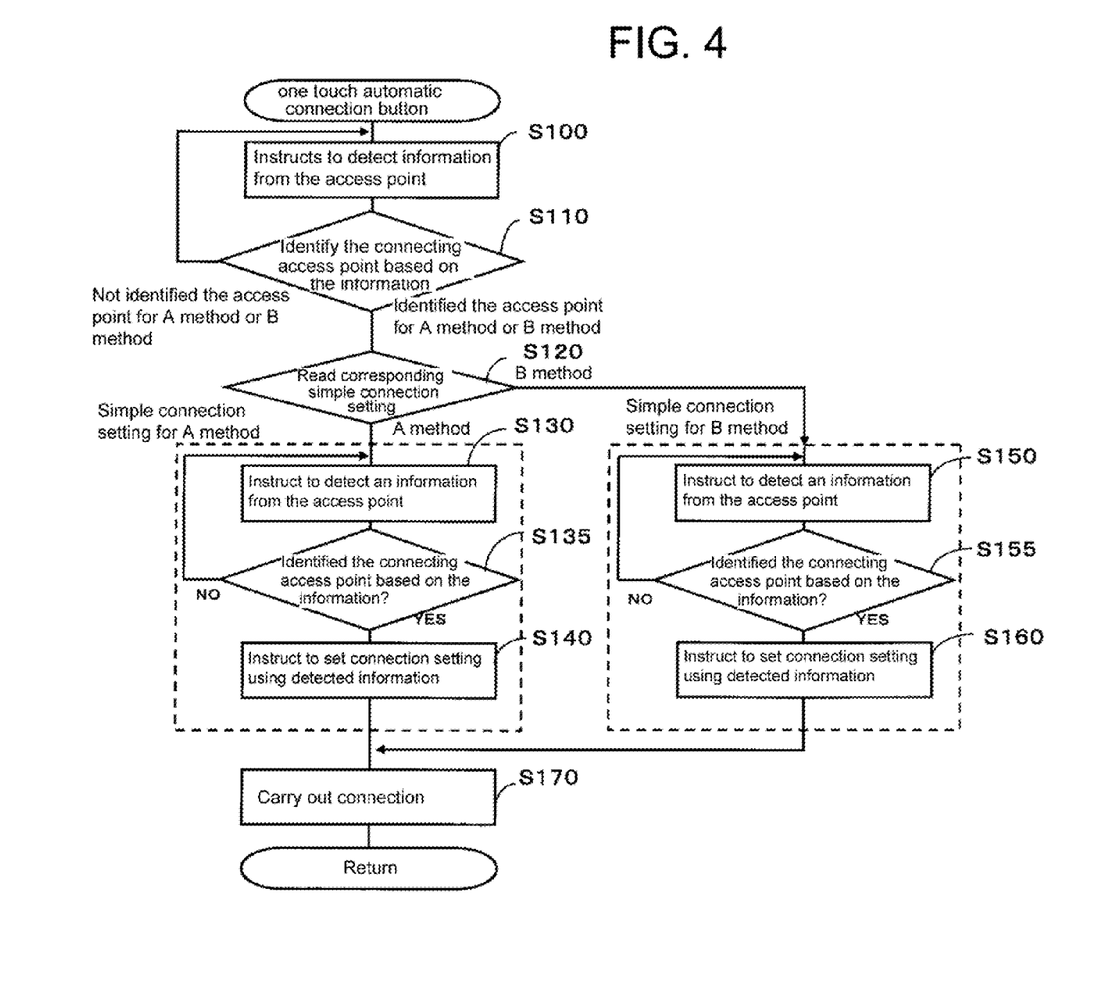
FIG. 4 is a flow chart which CPU of terminal 20 carries out.

FIG. 4 is a flow chart which a CPU23 of the terminal 20 carries out as the simple connection setting. The simple connection setting of the terminal 20 of this invention will be explained along with FIG. 4 as follows. In addition, the flow chart in FIG. 4 assumes that simple connection setting program 202*a* corresponding to the A method of the simple connection setting and simple connection setting program 202*b* corresponding to the B method of the simple connection setting are implemented to the recording medium 22 of the terminal 20 beforehand.

The user operates a simple connection setting button 15 of the terminal 20 or an icon for the simple connection setting on the screen which the terminal 20 displays, and further operates a registration button 71 of the access point 50. Then the CPU23 retrieves a connection setting control program 203 and carries out the program on a RAM25. Here, it is assumed that A method of the simple connection setting or B method of the simple connection setting is distinguished using an information stored in a beacon or a probe response. More concretely, if service set ID in the information stored in the beacon or the probe response is converted into a special mode, the type of the simple connection setting is the A method. In addition, if new ID (special ID) is set in the information stored in the beacon or the probe response, the type of the simple connection setting is the B method.

At first, the CPU23 acquires an information output from the access point 50, and outputs an instructions for identifying the connecting access point 50 to the wireless LAN adapter 10 (step S100). More concretely, CPU23 instructs the wireless LAN adapter 10 through the device driver 201 to detect a beacon or a probe response output by the access point 50. The detection instructions by CPU23 are repeated until the connecting access point 50 is identified. According to the above instructions, the wireless LAN adapter 10 receives a beacon or a probe response output by the access point 50 (the first detecting operation). Hereby CPU23 with the connection setting control program 203 constitutes the access point identifier.

Then the CPU23 carries out the simple connection setting based on the information stored in a beacon or a probe response by the wireless LAN adapter 10 through a wireless communication interface 11, and identifies the connecting access point 50 (step S110). If service set ID in the information stored in the beacon or the probe response is converted into a special mode, CPU23 reads the simple connection setting program 202a corresponding to the A method of the simple connection setting from the recording medium 22 and carries it out (step S120). Similarly, if special ID is stored in the information stored in the acquired beacon or probe response, CPU23 reads the simple connection setting program 202b corresponding to the B method of the simple connection setting from the recording medium 22 and carries it out (step S120). Hereby CPU23 with the connection setting control program 203 constitutes the connection setting selector.

Hereinafter, an explanation of a flow which is carried out in accordance with A method of the simple connection setting will be mainly described. When CPU23 carries out the simple connection setting program 202a in step S120, CPU23 instructs it to detect an information from the access point 50 in order to set according to the A method of the simple connection setting (step S130). More concretely, CPU23 instructs the wireless LAN adapter 10 through device driver 201. Thus the wireless LAN adapter 10 receives a beacon or a probe response output by the access point 50 by driving wireless LAN13 (the second detecting operation). Hereby CPU23 with the simple connection setting program 202 constitutes the connection setting processor.

When the CPU23 acquires the information from the beacon or the probe response, the CPU23 identifies the connecting access point 50 (step S135). If an information is not detected, CPU23 repeats detection instructions until the information is detected. In addition, CPU23 may consider the state that the information is not detected to be an error state, and may terminate simple connection setting in step S135. When the connecting access point 50 is identified in step S135, connection setting between the access point 50 and the terminal 20 is decided and a decided value is output to OS200 (step S140). Furthermore, CPU23 carries out connection of wireless LAN with a connection function implemented with OS200 by the recording medium 22 (step S170).

It is also true that when B method of the simple connection setting is chosen at step S120, the CPU23 carries out the same flow as explained above at step S150 to S170, and sets connection setting of wireless LAN in accordance with the B method of the simple connection setting.

(2) A FORM OF THE SECOND EMBODIMENT

According to the first embodiment explained above, it comprises a constitution where connection setting between the terminals 20, 30, 40 and the access point 50 with any kind of simple connection setting can be carried out by easy operation. Furthermore, according to the second embodiment, the transaction speed in the simple connection setting is increased by devising the program that CPU23 of the terminal 20, 30, 40 carries out.

In detail, the CPU23 of the terminal carries out detecting operation twice at the simple connection setting. Namely, such operations are detection (the first detecting operation) for detecting the information to identify the access point 50 and detection (the second detection movement) for detecting the information to decide various setting for the simple connection setting. The detecting operation is carried out by CPU23 that lets through device driver 201 the wireless LAN adapter 10 detect a beacon or a probe response. The detection of the information output by the access point 50 requires some period of time, because it is physical to drive the device. Therefore, according to the second embodiment, detecting operation of the wireless LAN adapter 10 is omitted, and the processing time required for the simple connection setting is shortened.

An explanation for concrete constitution follows hereinafter. In addition, the construction of the access point 50 and the terminals 20, 30, 40 in the second embodiment is almost same with the one of the first embodiment. In addition, the recording medium 22 of the terminal 20 stores the same simple connection setting program 202 as with the first embodiment and that corresponds to the A method of the simple connection setting and the B method of the simple connection setting.

Figure 5:
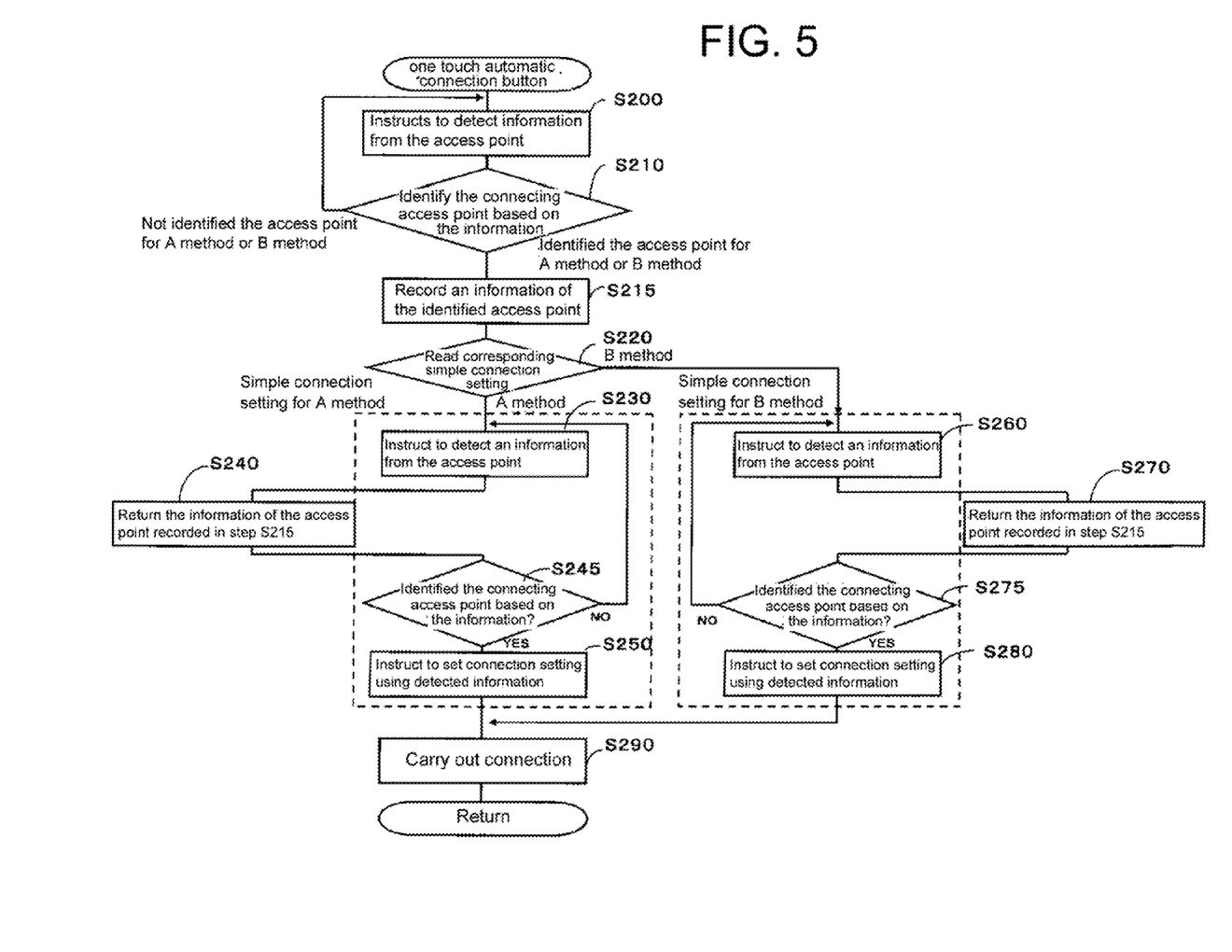
FIG. 5 is a flow chart which CPU23 carries out in the second embodiment.

As shown in the FIG. 5, the user operates a simple connection setting button 15 of the terminal 20 or an icon for the simple connection setting on the screen which the terminal 20 displays, and further operates a registration button 71 of the access point 50. More concretely, through device driver 201, CPU23 instructs the wireless LAN adapter 10 to detect a beacon or a probe response output from the access point 50. Along with the instruction, the wireless LAN adapter 10 receives a beacon or a probe response output by the access point 50. Then the access point 50 is identified using the information stored in the beacon or the probe response (step S210). CPU23 records an information of the identified access point 50 in RAM25 (step S215). Furthermore, CPU23 reads out the simple connection setting program 202 corresponding to the simple connection setting (step S220). If the access point intended in S210 is not detected, CPU23 loops between step S200-S210 (repeats steps S200-S210). This loop will be repeated until the access point intended in step S210 is found.

Following explanation is based on A method of the simple connection setting which the CPU23 distinguished with the acquired information. At first, CPU23 instructs detection of the information output by the identified access point 50 in step S230. Then CPU23 returns the information of the access point 50 recorded in step S215 (step S240). When the CPU23 acquires the information from the beacon or the probe response, the CPU23 identifies the connecting access point 50 (step S245). When the connecting access point 50 is identified in step S245, connection setting between the access point 50 and the terminal 20 is decided and a decided value is output to OS200 (step S250). Furthermore, CPU23 carries out connection setting with the identified access point 50 (step S290). In step S250, CPU23 does not instruct wireless LAN adapter 10 through device driver 201 detection of the information output by the access point 50 because CPU23 makes decision based on the information recorded in RAM25. Hereby, it becomes possible to shorten time for simple connection setting without Wireless LAN adapter 10 detecting the information output by the access point 50.

It is also true that when B method of the simple connection setting is chosen at step S220, the CPU23 carries out the same flow as explained above at step S260 to S280, and sets connection setting of wireless LAN in accordance with the B method of the simple connection setting.

Figure 6:
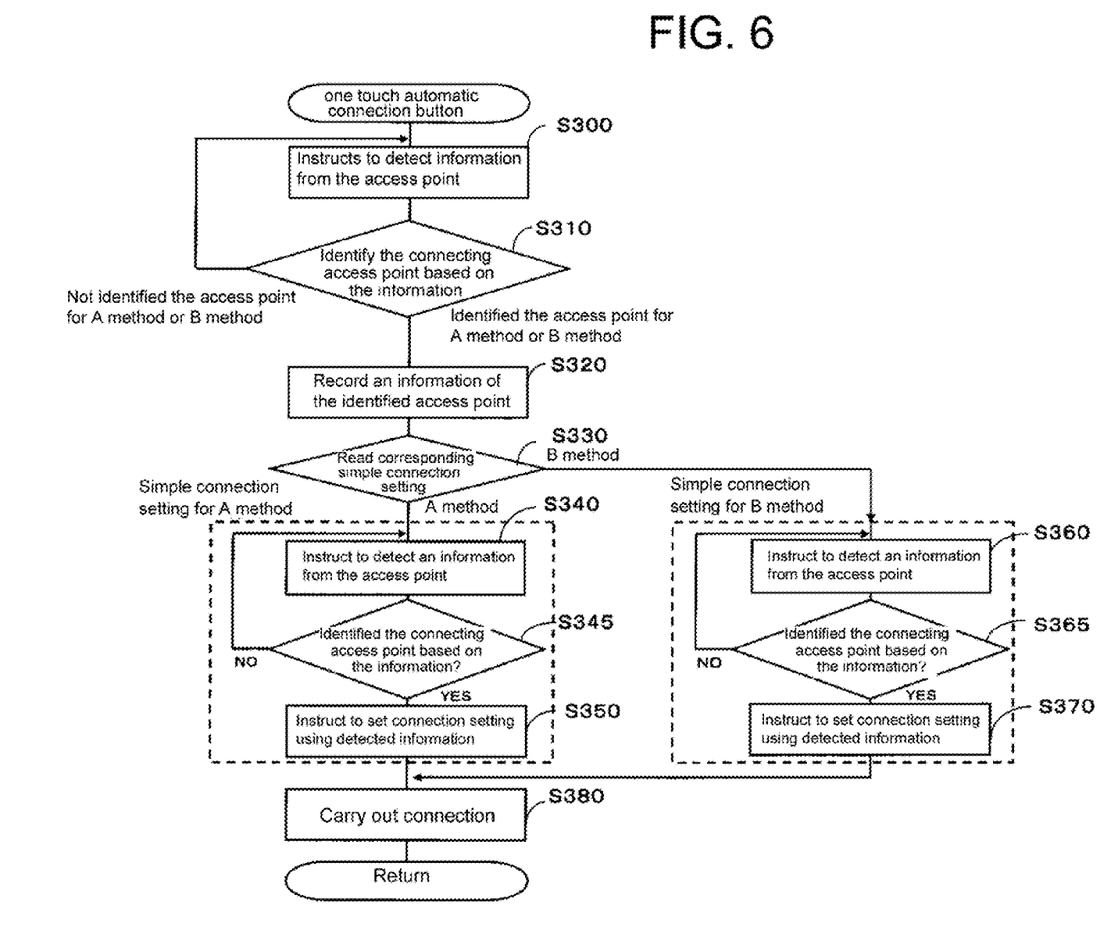
FIG. 6 is a flow chart which CPU23 carries out in the second embodiment.
Figure 7:
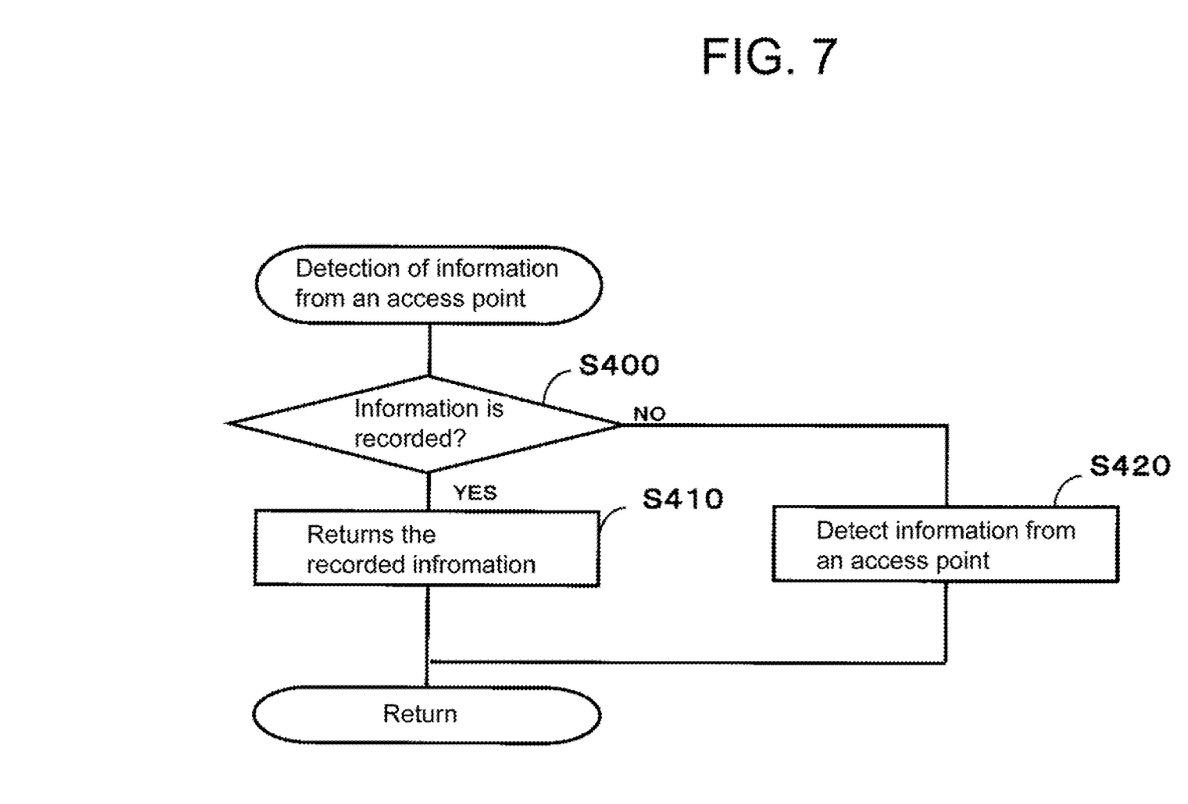
FIG. 7 is a flow chart which a device driver carries out in the second embodiment.

Further, as shown in FIG. 6 and FIG. 7, the CPU23 may directly instruct a device driver 201. FIG. 7 shows a flow of device driver 201. When CPU23 records an information at step S320 in FIG. 6, CPU23 reads out the simple connection setting program 202 corresponding to the simple connection setting in step S330, and then instructs the device driver 201 in S340. If the information is recorded (steps S400), the device driver 201 omits the second detecting operation by returning the result of the recorded information (step S410) instead of giving an instruction to the wireless LAN adapter 10 to receive a beacon or a probe response (step S420). In addition, if the access point intended for in S310 is not detected, CPU23 loops between step S300-S310 until the access point is identified. When the CPU23 acquires the information from the beacon or the probe response, the CPU23 identifies the connecting access point 50 (step S345). When the connecting access point 50 is identified in step S345, connection setting between the access point 50 and the terminal 20 is decided and a decided value is output to OS200 (step S350). Furthermore, CPU23 carries out connection setting with the identified access point 50 (step S380).

It is also true that when B method of the simple connection setting is chosen at step S330, the CPU23 carries out the same flow as explained above at step S360 to S370, and sets connection setting of wireless LAN in accordance with the B method of the simple connection setting.

(3) SUMMARY

As explained above, according to the wireless LAN system 100, a program which corresponds each methods of simple connection setting is stored in the terminals 20, 30, 40 and the simple connection setting which the access point 50 adopts is detected by detecting an information output by the access point 50. And the connection setting of the wireless LAN with the detected simple connection setting is carried out. Therefore, even if the access point 50 corresponds to what kind of simple connection setting, user may carry out connection setting between the access point 50 and the terminals 20, 30, 40 by an easy operation.

This invention is not limited to the embodiment explained above.

It is not to need to say if it is these skilled in the art.

Changing combination of any parts or elements which are replaceable with each other as described in the above embodiment appropriately, or applying appropriately a change of combination of any parts or elements which are replaceable with each other and even though they are not disclosed in the above embodiment but are well known prior art, or replacing any parts or elements which are available based on prior art by a person with ordinary skills with ones described in the above embodiment or applying a change of combination thereof are also described as an embodiment of this invention.

What is claimed is:

1. A wireless LAN system, comprising:
an access point and a terminal that includes a device for wireless LAN connection is capable of simple connection setting for wireless LAN;
said terminal comprises:
a simple connection setting recorder to record a plurality of simple connection setting programs for setting of security level and ESS-ID corresponding to each methods of simple connection setting in a nonvolatile recording medium,
an access point identifier to identify method of simple connection setting by detecting an information that is output by the access point,
a connection setting selector to select a simple connection setting program corresponding to the method of simple connection setting which the access point identifier identified among the simple connection setting programs recorded in the simple connection setting recorder, wherein the access point identifier identifies the program of simple connection setting by detecting information stored in a beacon or probe response output by the access point, wherein the information comprises a service set ID which can be converted into a special mode or a new ID which can be set in the information,
a connection setting processor to read out a simple connection setting program selected by the connection setting selector, and to carry out setting of security level and ESS-ID for the access point, wherein
the access point identifier and the connection setting selector detect the method of simple connection setting for the access point as a first step, and the connection setting processor carry out the setting of security level and ESS-ID as a second step in order to connect with the access point.

2. The wireless LAN system of claim 1, wherein:
said terminal comprises
said access point identifier that detects the information to identify the access point to be connected with as the first detecting operation and
said connection setting processor that detects the information to process the connection setting to connect with the identified access point for connection as the second detecting operation,
said connection setting processor uses the information that said access point identifier detects by the first detecting operation, omitting second detecting operation.

3. The wireless LAN system of claim 1, wherein:
said terminal receives one of beacon and probe response output by the access point, and detects the information stored in one of the beacon and probe response.

4. The wireless LAN system of claim 1, wherein:
the simple connection setting is processed when a connection setting button of the access point and a connection setting button of the terminal are operated.

5. A wireless LAN terminal, comprising:
a device for wireless LAN connection that communicates wirelessly with an access point that is a relay capable of simple connection setting,
said wireless LAN terminal comprises:
a simple connection setting recorder to record a plurality of simple connection setting programs for setting of security level and ESS-ID corresponding to each methods of simple connection setting in a nonvolatile recording medium,
an access point identifier to identify method of simple connection setting by detecting an information that is output by the access point,
a connection setting selector to select a simple connection setting program corresponding to the method of simple connection setting which the access point identifier identified among the simple connection setting programs recorded in the simple connection setting recorder, wherein the access point identifier identifies the program of simple connection setting by detecting information stored in a beacon or probe response output by the access point, wherein the information comprises a service set ID which can be converted into a special mode or a new ID which can be set in the information,
a connection setting processor to read out a simple connection setting program selected by the connection setting selector, and to carry out setting of security level and ESS-ID for the access point, wherein
the access point identifier and the connection setting selector detect the method of simple connection setting for the access point as a first step, and the connection setting processor carry out the setting of security level and ESS-ID as a second step in order to connect with the access point.

* * * * *